(12) United States Patent
Oshidari (10) Patent No.: US 11,555,537 B2
(45) Date of Patent: Jan. 17, 2023

(54) POWER TRANSMISSION DEVICE

(71) Applicant: JATCO LTD, Fuij (JP)

(72) Inventor: Toshikazu Oshidari, Kanagawa (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 17/428,545

(22) PCT Filed: Nov. 12, 2019

(86) PCT No.: PCT/JP2019/044222
§ 371 (c)(1),
(2) Date: Aug. 4, 2021

(87) PCT Pub. No.: WO2020/161979
PCT Pub. Date: Aug. 13, 2020

(65) Prior Publication Data
US 2022/0154810 A1  May 19, 2022

(30) Foreign Application Priority Data

Feb. 8, 2019 (JP) .............................. JP2019-022136

(51) Int. Cl.
*F16H 48/08* (2006.01)
*F16H 48/40* (2012.01)
(Continued)

(52) U.S. Cl.
CPC .............. *F16H 48/08* (2013.01); *F16H 48/40* (2013.01); *B60K 2001/001* (2013.01); *F16H 48/10* (2013.01)

(58) Field of Classification Search
CPC ......... F16H 48/08–2048/087; F16H 48/10–11; F16H 2048/366–368; B60K 2001/001; B60K 2007/0092
See application file for complete search history.

(56) References Cited

U.S. PATENT DOCUMENTS 5,533,943 A   7/1996  Ichioka et al.
5,643,127 A   7/1997  Yoshii et al.
(Continued)

FOREIGN PATENT DOCUMENTS

JP   H07-301306 A   11/1995
JP   H08-240254 A    9/1996
(Continued)

*Primary Examiner* — Ernesto A Suarez
*Assistant Examiner* — James J Taylor, II
(74) *Attorney, Agent, or Firm* — Global IP Counselors, LLP (57) ABSTRACT

A power transmission device including a planetary gear, a differential gear and a differential case. The planetary gear includes a carrier, and pinion gears supported by pinion shafts. The differential gear includes a pair of bevel gears supported by a bevel gear shaft, and side gears engaged with the bevel gears. The carrier defines pinion shaft insertion holes in which pinion shafts are respectively inserted. The differential case defines bevel gear shaft insertion holes in which the bevel gear shaft is inserted. A straight line that penetrates the bevel gear shaft insertion holes overlaps with the pinion shaft insertion holes in a circumferential direction, and the bevel gear shaft passes through a center of a circle that connects the pinion shaft insertion holes. When viewed along an axial direction, the pinion shafts do not overlap the side gears, with the side gears being arranged radially inwardly than the pinion shafts.

8 Claims, 5 Drawing Sheets

(51) Int. Cl.
*B60K 1/00* (2006.01)
*F16H 48/10* (2012.01)

(56) References Cited

U.S. PATENT DOCUMENTS

| | | | |
|---|---|---|---|
| 6,117,038 A | | 9/2000 | Nishiji et al. |
| 7,549,940 B2 * | | 6/2009 | Kira ................... B60K 6/365 |
| | | | 475/204 |
| 8,083,628 B2 * | | 12/2011 | Soybel .................. F16H 48/08 |
| | | | 475/160 |
| 8,508,090 B2 * | | 8/2013 | Tanaka .................. H02K 7/083 |
| | | | 192/113.32 |
| 2003/0094322 A1 | | 5/2003 | Bowen |
| 2015/0013488 A1 | | 1/2015 | Matsuoka et al. |
| 2016/0123454 A1 | | 5/2016 | Tahara et al. |
| 2018/0180162 A1 | | 6/2018 | Hakuta et al. |

FOREIGN PATENT DOCUMENTS

| JP | H11-344100 A | 12/1999 |
|---|---|---|
| JP | 3774750 B2 | 5/2006 |
| JP | 2013-221566 A | 10/2013 |
| JP | 2016-089860 A | 5/2016 |
| JP | 2018-103676 A | 7/2018 |

* cited by examiner

POWER TRANSMISSION DEVICE

CROSS-REFERENCE TO RELATED APPLICATIONS

This is a U.S. national phase application of PCT/JP2019/044222, filed on Nov. 12, 2019, which claims priority to Japanese Patent Application No. 2019-022136, filed on Feb. 8, 2019. The entire disclosure of Japanese Patent Application No. 2019-022136 is hereby incorporated herein by reference.

TECHNICAL FIELD

The present invention relates to a power transmission device.

BACKGROUND ART

In Japanese Laid-Open Patent Publication No. 2013-221566, Japanese Laid-Open Patent Publication No. 2016-89860, and Japanese Laid-Open Patent Publication No. 2018-103676, disclosed is a power transmission device.

The power transmission device of Japanese Laid-Open Patent Publication No. 2013-221566 has three rotation axes that are involved in rotation transmission aligned in parallel, and the size easily increases in the vertical direction (gravity direction) (hereafter called the "3-axis type").

In the power transmission device of Japanese Laid-Open Patent Publication No. 2016-89860, a rotor of a motor is a hollow shaft, and a drive shaft penetrates the interior of this hollow shaft. For that reason, compared to the 3-axis type, it is possible to reduce the size in the vertical direction, but due to placement of a large counter gear, it ends up increasing in size in the vertical direction (hereafter called the "2-axis type").

In the power transmission device of Japanese Laid-Open Patent Publication No. 2018-103676, rather than the counter gear, a planetary reduction gear having a stepped pinion is used, and compared to the 2-axis type, it is possible to reduce the size in the vertical direction (hereafter called the "1-axis type").

The output element of the planetary reduction gear of the 1-axis type of Japanese Laid-Open Patent Publication No. 2018-103676 is a ring gear, but it is also possible to have the output element be a carrier.

SUMMARY

There is a demand to reduce the size of the power transmission device having a carrier output planetary reduction gear and a differential device.

One embodiment of the present disclosure is directed to a power transmission device in which a carrier of a planetary gear and a differential case of a differential gear are integrally formed, wherein the power transmission device is configured such that the planetary gear has pinion shaft insertion holes in which are inserted pinion shafts that support pinion gears, the differential case has bevel gear shaft insertion holes in which is inserted a bevel gear shaft that supports a pair of bevel gears, and a straight line that penetrates the bevel gear shaft insertion holes overlaps with a plurality of the pinion shaft insertion holes in the circumferential direction, and the bevel gear shaft passes through the center of a circle that connects the plurality of pinion shaft insertion holes.

According to the embodiment, it is possible to reduce the size of the power transmission device in the axial direction.

DETAILED DESCRIPTION OF EMBODIMENTS

Following, embodiments of the present invention are explained.

Figure 1:
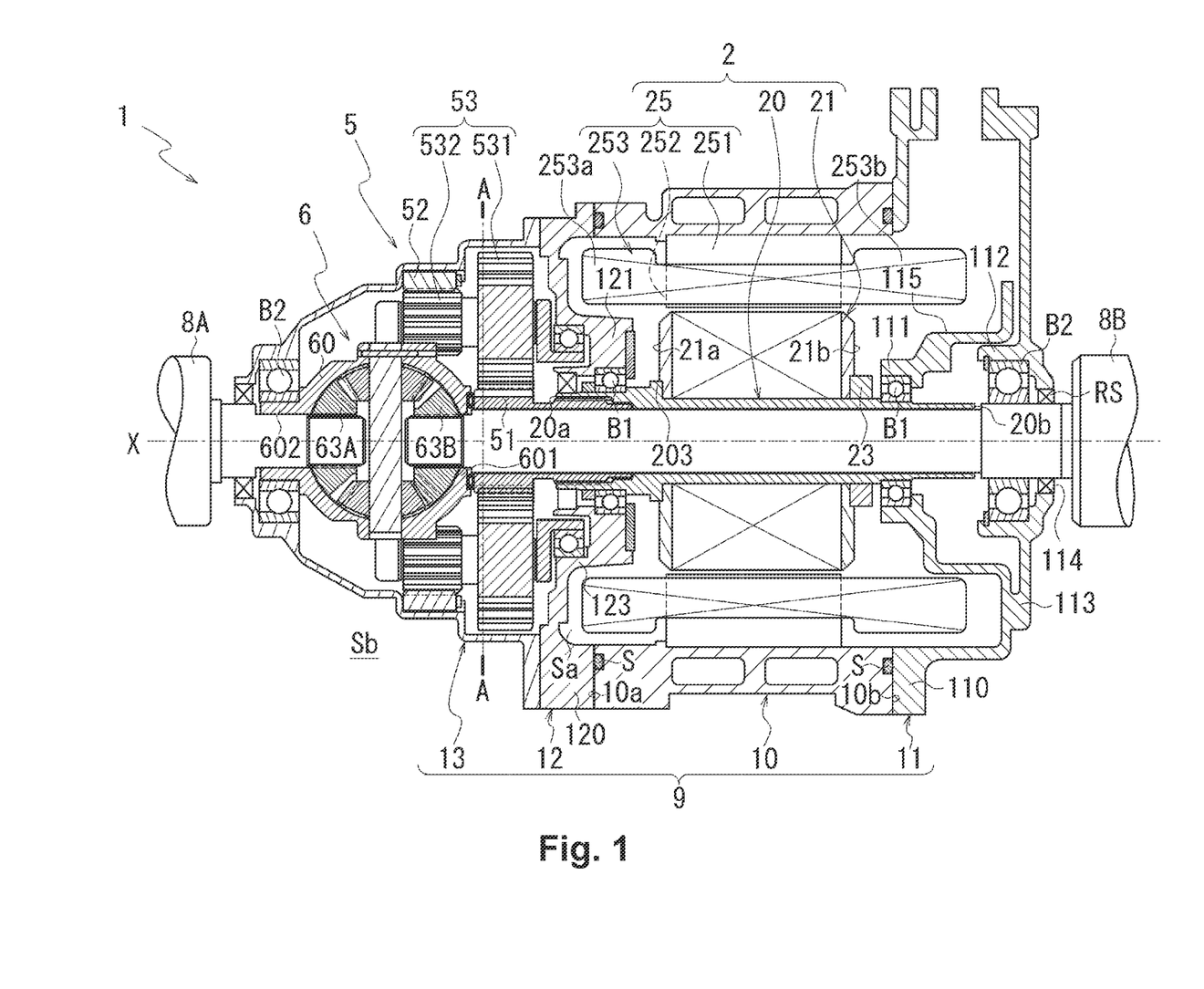
FIG. 1 is a drawing for explaining a power transmission device of the present embodiment.

FIG. 1 is a drawing for explaining a power transmission device 1 of the present embodiment.

Figure 2:
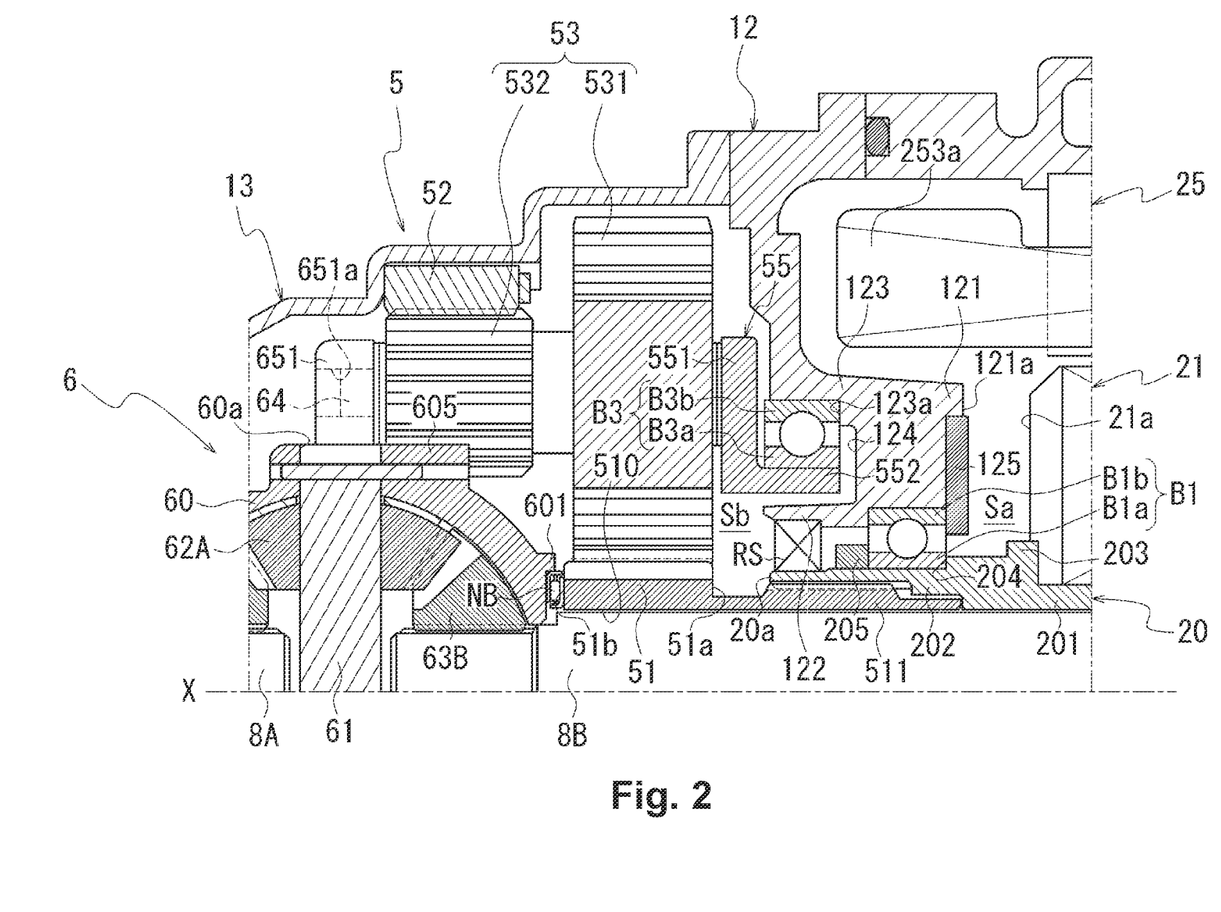
FIG. 2 is an enlarged view around a planetary reduction gear of the power transmission device.
Figure 3:
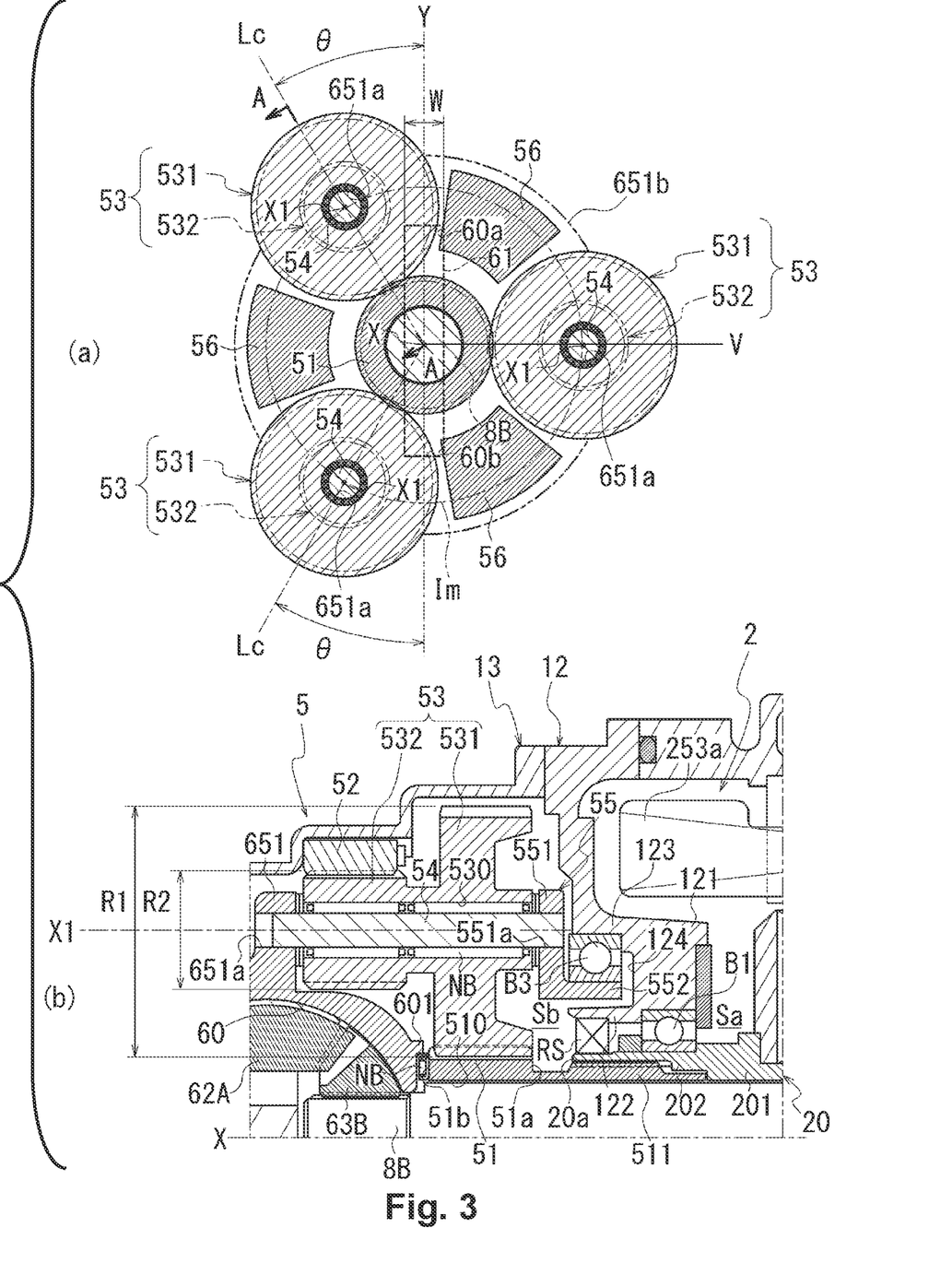
FIG. 3 is an enlarged view around the planetary reduction gear of the power transmission device.

FIG. 2 and FIG. 3 are enlarged views around a planetary reduction gear 5 of the power transmission device 1.

FIG. 3($a$) is a cross section view of a stepped pinion gear 53 cut along line A-A of FIG. 1. FIG. 3($b$) is a cross section view of the stepped pinion gear 53 cut along line A-A in FIG. 3($a$).

With FIG. 3($a$), to explain the positional relationship of a shaft 61 of a differential device 6 and the stepped pinion gear 53 of the planetary reduction gear 5, the position of the shaft 61 is shown with dashed lines.

As shown in FIG. 1, the power transmission device 1 has: a motor 2; the planetary reduction gear 5 (reduction mechanism) that reduces output rotation of the motor 2 and inputs that to the differential device 6; and drive shafts 8 (8A, 8B).

With the power transmission device 1, the planetary reduction gear 5, the differential device 6, and the drive shafts 8 (8A, 8B) are provided along the transmission route of the output rotation of the motor 2.

The output rotation of the motor 2 is reduced by the planetary reduction gear 5, and after being inputted to the differential device 6, is transmitted via the drive shafts 8 (8A, 8B) to drive wheels (not illustrated) at left and right of a vehicle in which the power transmission device 1 is mounted. In FIG. 1, the drive shaft 8A is connected so that rotation can be transmitted to the left wheel of the vehicle in which the power transmission device 1 is mounted, and the drive shaft 8B is connected to be able to transmit rotation to the right wheel.

Here, the planetary reduction gear 5 is connected downstream of the motor 2, the differential device 6 is connected downstream of the planetary reduction gear 5, and the drive shafts 8 (8A, 8B) are connected downstream of the differential device 6.

The motor 2 has: a cylindrical motor shaft 20; a cylindrical rotor core 21 externally fitted on the motor shaft 20; and a stator core 25 that surrounds the outer periphery of the rotor core 21 with a prescribed gap.

The motor shaft 20 is provided to be able to rotate relatively with respect to the drive shaft 8B in a state externally fitted on the drive shaft 8B.

With the motor shaft 20, bearings B1, B1 are externally fitted and fixed to the outer periphery of one end 20$a$ side and another end 20$b$ side in the longitudinal direction.

The one end 20a side of the motor shaft 20 is supported to be able to rotate by a cylindrical motor support unit 121 of an intermediate case 12 with the bearing B1 interposed.

The other end 20b side of the motor shaft 20 is supported to be able to rotate by a cylindrical motor support unit 111 of a cover 11 with the bearing B1 interposed.

The motor 2 has a motor housing 10 that surrounds the outer periphery of the rotor core 21 with a prescribed gap. With the present embodiment, the intermediate case 12 is joined to one end 10a of the motor housing 10, and the cover 11 is joined to the other end 10b of the motor housing 10.

Seal rings S, S are provided on the one end 10a and the other end 10b of the motor housing 10. The one end 10a of the motor housing 10 is joined without a gap to a ring-shaped base 120 of the intermediate case 12 by the seal ring S provided on that one end 10a.

The other end 10b of the motor housing 10 is joined without a gap to a ring-shaped junction part 110 of the cover 11 by the seal ring S provided on that other end 10b.

With the intermediate case 12, the base 120 and the motor support unit 121 are provided with the positions displaced in the rotation axis X direction.

With the present embodiment, when the intermediate case 12 is fixed to the one end 10a of the motor housing 10, the motor support unit 121 is made to be inserted inside the motor housing 10.

In this state, the motor support unit 121 is arranged facing a one end part 21a of the rotor core 21 with a gap open in the rotation axis X direction at the inner diameter side of a coil end 253a noted later (see FIG. 2).

Also, as shown in FIG. 2, a connecting part 123 that connects the base 120 and the motor support unit 121 is provided in a direction along the rotation axis X, avoiding contact with the coil end 253a and a side plate 551 noted later.

A bearing retainer 125 is fixed to an end surface 121a of the rotor core 21 side of the motor support unit 121.

The bearing retainer 125 has a ring shape when seen from the rotation axis X direction. The inner diameter side of the bearing retainer 125 abuts the side surface of an outer race B1b of the bearing B1 supported by the motor support unit 121 from the rotation axis X direction. The bearing retainer 125 prevents falling off of the bearing B1 from the motor support unit 121.

As shown in FIG. 1, with the cover 11, the junction part 110 and the motor support unit 111 are provided with the positions displaced in the rotation axis X direction.

With the present embodiment, when the junction part 110 of the cover 11 is fixed to the other end 10b of the motor housing 10, the motor support unit 111 is made to be inserted inside the motor housing 10.

In this state, the motor support unit 111 is arranged facing an other end part 21b of the rotor core 21 with a gap open in the rotation axis X direction at the inner diameter side of a coil end 253b described later.

A connecting part 115 that connects the junction part 110 and a side wall part 113 of the cover 11 is provided along the rotation axis X while avoiding contact with the coil end 253b and a support cylinder 112 described later.

Inside the motor housing 10, the rotor core 21 is arranged between the motor support unit 111 of the cover 11 side, and the motor support unit 121 of the intermediate case 12 side.

The rotor core 21 is formed by laminating a plurality of silicon steel sheets, and each of the silicon steel sheets is externally fitted on the motor shaft 20 in a state where relative rotation with the motor shaft 20 is regulated.

Seen from the rotation axis X direction of the motor shaft 20, the silicon steel sheet has a ring shape, and at the outer peripheral side of the silicon steel sheet, N pole and S pole magnets (not illustrated) are provided alternately in the circumferential direction around the rotation axis X.

The one end part 21a of the rotor core 21 in the rotation axis X direction is positioned using a large diameter part 203 of the motor shaft 20. The other end part 21b of the rotor core 21 is positioned using a stopper 23 press fitted in the motor shaft 20.

The stator core 25 is formed by laminating a plurality of electromagnetic steel sheets, and each of the electromagnetic steel sheets has a ring-shaped yoke part 251 fixed to the inner circumference of the motor housing 10, and a teeth part 252 projecting to the rotor core 21 side from the inner circumference of the yoke part 251.

With the present embodiment, the stator core 25 having a configuration in which a winding 253 is distributed and wound across a plurality of teeth parts 252 is adopted, and the stator core 25 has a longer length in the rotation axis X direction than the rotor core 21 by the amount of the coil ends 253a, 253b projecting in the rotation axis X direction.

It is also possible to adopt the stator core of a configuration in which the windings are concentrically wound on each of the plurality of teeth parts 252 projecting to the rotor core 21 side.

With the motor shaft 20, the bearing B1 is press-fitted further to the outer circumference of the area of the one end 20a side than the large diameter part 203.

As shown in FIG. 2, with an inner race B1a of the bearing B1, one side surface of the rotation axis X direction abuts a step part 204 provided on the outer circumference of the motor shaft 20. With the inner race B1a, a ring-shaped stopper 205 that is press-fitted in the outer circumference of the motor shaft 20 abuts the other side surface.

With the bearing B1, the inner race B1a is positioned by the stopper 205 at a position abutting the step part 204.

The one end 20a of the motor shaft 20 is positioned more to the differential device 6 side (left side in the drawing) than the stopper 205. In the rotation axis X direction, the one end 20a faces a side surface 51a of a sun gear 51 of the planetary reduction gear 5 with a gap open.

At the one end 20a side of the motor shaft 20, a cylinder wall 122 is positioned radially outward of the motor shaft 20. The cylinder wall 122 projects to the differential device 6 side (left side in the drawing) from the motor support unit 121.

The cylinder wall 122 surrounds the outer circumference of the motor shaft 20 with a prescribed gap, and a lip seal RS is arranged between the cylinder wall 122 and the motor shaft 20.

The lip seal RS is provided to partition a space Sa of the inner diameter side of the motor housing 10 and a space Sb of the inner diameter side of a case 13.

Lubricating oil OL of the differential device 6 is sealed in the space Sb of the inner diameter side of the case 13. The lip seal RS is provided to prevent inflow of the lubricating oil OL to the space Sa of the inner diameter side of the motor housing 10.

At the outer diameter side of the cylinder wall 122, between that and the aforementioned connecting part 123, a recess 124 open at the planetary reduction gear 5 side (left side in FIG. 2) is formed.

On the connecting part 123 side (outer diameter side) of the recess 124, a step part 123a that positions an outer race B3b of a bearing B3 is provided. Inside the recess 124, an inner race B3a of the bearing B3 is provided avoiding contact with the motor support unit 121, and the inner race B3a supports the outer circumference of a cylindrical part 552 described later.

With the present embodiment, a body case 9 of the power transmission device 1 is constituted by the motor housing 10, the cover 11, the intermediate case 12, and the case 13.

The internal space of the body case 9 uses the intermediate case 12 as a boundary, and the space Sa of the motor housing 10 side serves as a motor chamber that houses the motor 2. Spaces Sb, Sc of the case 13 side serve as gear chambers that house the planetary reduction gear 5 and the differential device 6.

As shown in FIG. 2, an area (linking part 202) of the one end 20a side of the motor shaft 20 is formed with a larger inner diameter than an area 201 on which the rotor core 21 is externally fitted.

A cylindrical linking part 511 of the sun gear 51 is inserted inside the linking part 202 of this one end 20a side. In this state, the linking part 202 of the one end 20a side of the motor shaft 20 and the linking part 511 of the sun gear 51 are spline fitted without being able to rotate relatively.

For this reason, the output rotation of the motor 2 is inputted to the sun gear 51 of the planetary reduction gear 5 via the motor shaft 20, and the sun gear 51 rotates around the rotation axis X by the rotational drive power of the motor 2.

The sun gear 51 has the linking part 511 extending in the rotation axis X direction from the side surface 51a of the inner diameter side. The linking part 511 is formed integrally with the sun gear 51, and a through hole 510 is formed straddling the inner diameter side of the sun gear 51 and the inner diameter side of the linking part 511.

The sun gear 51 is supported to be able to rotate on the outer circumference of the drive shaft 8B penetrating the through hole 510.

A side surface 51b of the differential device 6 side of the sun gear 51 faces a cylindrical abutting unit 601 of a differential case 60 described later with a gap open in the rotation axis X direction, and a needle bearing NB is interposed between the side surface 51b and the abutting unit 601.

As shown in FIG. 3(b), the sun gear 51 engages with a large diameter gear part 531 of a stepped pinion gear 53 on an extension of the abovementioned motor shaft 20.

The stepped pinion gear 53 has the large diameter gear part 531 that engages with the sun gear 51, and a small diameter gear part 532 having a smaller diameter than the large diameter gear part 531.

As shown in the cross section of the stepped pinion gear 53 portion in FIG. 3(b), the stepped pinion gear 53 is a gear component in which the large diameter gear part 531 and the small diameter gear part 532 are provided integrally, aligned in an axis line X1 direction that is parallel to the rotation axis X.

The stepped pinion gear 53 has a through hole 530 penetrating the inner diameter side of the large diameter gear part 531 and the small diameter gear part 532 in the axis line X1 direction.

The stepped pinion gear 53 is supported to be able to rotate on the outer circumference of a pinion shaft 54 penetrating the through hole 530 with the needle bearing NB interposed.

At the outer circumference of the pinion shaft 54, the needle bearing NB is provided respectively on the inner diameter side of the large diameter gear part 531, and the inner diameter side of the small diameter gear part 532. At the outer circumference of the pinion shaft 54, the needle bearings NB, NB are aligned in series in the axis line X1 direction.

One end and the other end in the longitudinal direction of the pinion shaft 54 are supported by a side plate 651 integrally formed with the differential case 60, and a side plate 551 arranged with a gap open on this side plate 651.

In specific terms, the one end and the other end in the longitudinal direction of the pinion shaft 54 are each inserted from the axis line X1 direction and fixed to a support hole 651a of the side plate 651 and a support hole 551a of the side plate 551.

The side plates 651, 551 are provided in parallel with each other with a gap open in the rotation axis X direction.

Between the side plates 651, 551, the plurality of stepped pinion gears 53 are provided in a plurality (three, for example) at a prescribed interval in the circumferential direction around the rotation axis X (see FIG. 3(a)).

For that reason, the same number of pinion shafts 54 that support the stepped pinion gears 53 are provided as the stepped pinion gears 53. The same number of support holes 651a of the side plates 651 and the support holes 551a of the side plates 551 are provided as the stepped pinion gears 53.

In FIG. 3, the small diameter parts 532 positioned at the front side of the paper surface adjacent to the large diameter gear parts 531 are shown by virtual lines. Furthermore, the position of an outer circumference 651b of the side plate 651 that supports the pinion shafts 54 is shown by a virtual line marked with code 651b, more to the front side of the paper surface than the small diameter gear parts 532.

The position of the shaft 61 described later positioned more to the front side of the paper surface than the small diameter gear parts 532 is shown by a dotted line marked with code 61, and also, the positions of the shaft holes 60a, 60b in which the one end and the other end of the shaft 61 are inserted are shown marked with codes 60a, 60b.

As shown in FIG. 3(a), viewing from the rotation axis X direction, the outer circumference 651b of the side plate 651 has an arc shape with the rotation axis X as the center. There is a plurality of pinion shafts 54 that support the stepped pinion gears 53 (three with the present embodiment) provided in the circumferential direction around the rotation axis X further to the inner diameter side (rotation axis X) side than the outer circumference 651b.

The pinion shafts 54 are positioned on the same virtual circle Im that has the rotation axis X as the center. For that reason, the support holes 651a of the pinion shafts 54 provided on the side plate 651 are also positioned on the same virtual circle Im with the rotation axis X as the center when seen from the rotation axis X direction.

As shown in FIG. 3(a), connecting beams 56 provided in a direction along the rotation axis X are positioned between stepped pinion gears 53 adjacent in the circumferential direction around the rotation axis X.

The connecting beams 56 are provided straddling the side plate 651 and the side plate 551 of the carrier 55, avoiding interference with the stepped pinion gears 53.

As shown in FIG. 3(b), each of the small diameter gear parts 532 is engaged with the inner circumference of the ring gear 52. The ring gear 52 is spline fitted with the inner circumference of the case 13, and relative rotation of the ring gear 52 with the case 13 is regulated.

The cylindrical part 552 extending to the motor 2 side is provided at the inner diameter side of the side plate 551. The cylindrical part 552 is inserted from the rotation axis X direction in the recess 124 of the intermediate case 12. Inside the recess 124, the cylindrical part 552 is provided avoiding contact with the motor support unit 121.

The cylindrical part 552 is positioned radially outward of the engaging part between the motor shaft 20, and the linking part 511 on the planetary reduction gear 5 side. The bearing B3 supported by the recess 124 is in contact with the outer circumference of the cylindrical part 552. The cylindrical part 552 of the side plate 551 is supported to be able to rotate on the intermediate case 12 with the bearing B3 interposed.

With the planetary reduction gear 5, one side plate 651 of the side plate 551 and the side plate 651 constituting the carrier 55 is formed integrally with the differential case 60 of the differential device 6.

For that reason, the carrier 55 (side plate 551, 651, pinion shaft 54) of the planetary reduction gear 5 is substantially formed integrally with the differential case 60.

With the planetary reduction gear 5, the output rotation of the motor 2 is inputted to the sun gear 51.

The output rotation inputted to the sun gear 51 is inputted to the stepped pinion gears 53 via the large diameter gear parts 531 that engage with the sun gear 51, and the stepped pinion gears 53 rotate around the axis line X1.

Having done that, the small diameter gear parts 532 that are integrally formed with the large diameter gear parts 531 rotate around the axis line X1 integrally with the large diameter gear parts 531.

Here, the small diameter gear part 532 engages with the ring gear 52 fixed to the inner circumference of the case 13. For that reason, when the small diameter gear part 532 rotates around the axis line X1, the stepped pinion gear 53 rotates around the rotation axis X while auto-rotating around the axis line X1.

Having done that, the one end of the pinion shaft 54 is supported on the side plate 651 that is integrally formed with the differential case 60, so in conjunction with the displacement of the stepped pinion gear 53 in the circumferential direction around the rotation axis X, the differential case 60 rotates around the rotation axis X.

Here, with the stepped pinion gear 53, an outer diameter R2 of the small diameter gear part 532 is smaller than an outer diameter R1 of the large diameter gear part 531 (see FIG. 3(b)).

Also, with the planetary reduction gear 5, the sun gear 51 serves as the input unit of the output rotation of the motor 2, and the carrier 55 that supports the stepped pinion gear 53 serves as the output unit of the inputted rotation.

Having done that, the rotation inputted to the sun gear 51 of the planetary reduction gear 5, after being significantly reduced by the stepped pinion gear 53, is outputted to the differential case 60 with which the side plate 651 of the carrier 55 is Integrally formed.

Figure 4:
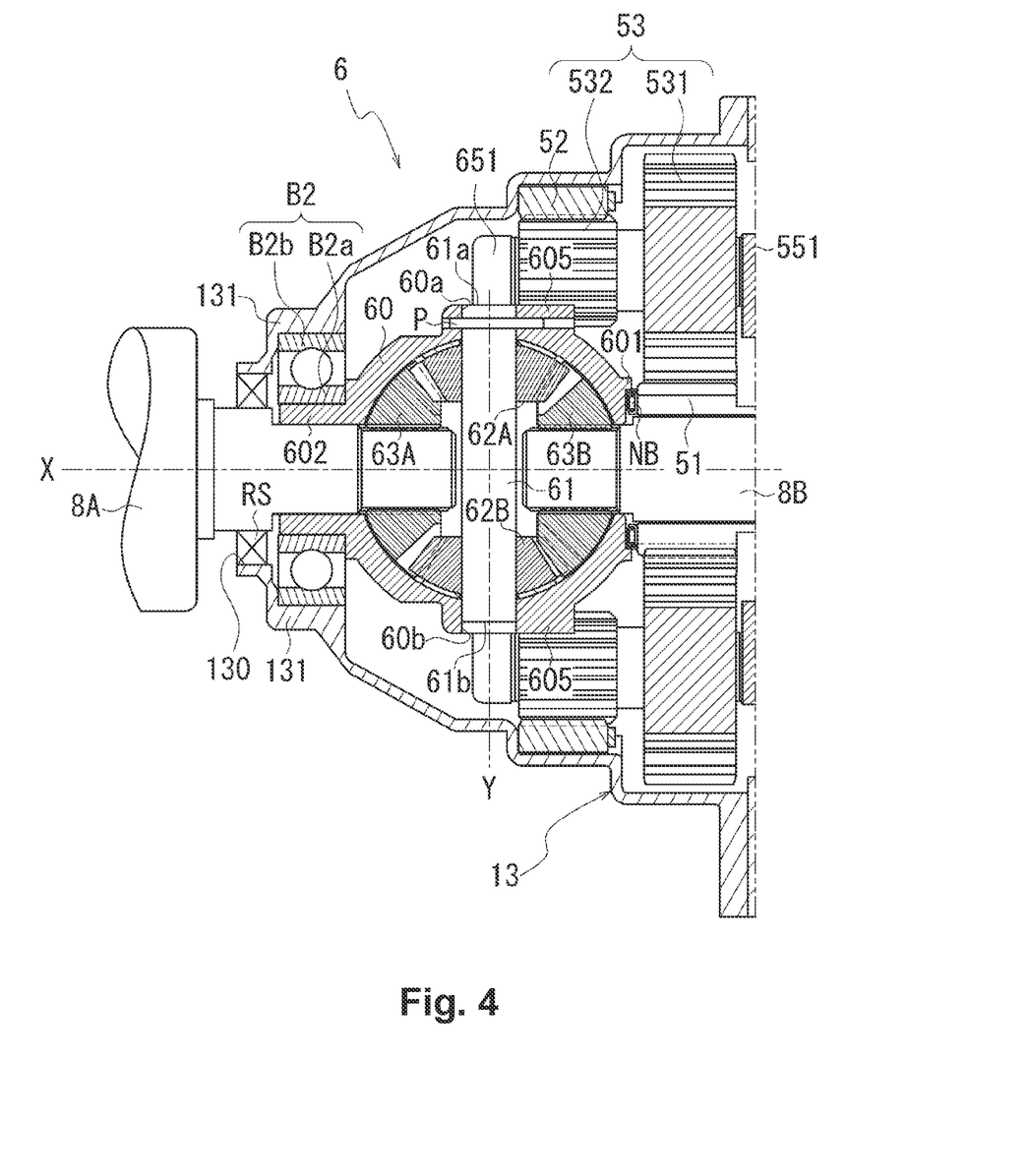
FIG. 4 is an enlarged view around a differential device of the power transmission device.

FIG. 4 is an enlarged view around the differential device 6 of the power transmission device 1.

As shown in FIG. 4, the differential case 60 is formed to have a hollow shape that internally houses the shaft 61, bevel gears 62A, 62B, and side gears 63A, 63B.

With the differential case 60, a cylindrical support unit 602 is provided at one side in the rotation axis X direction (lateral direction in the drawing), and the ring-shaped abutting unit 601 is provided at the other side.

The support unit 602 extends along the rotation axis X in the direction away from the shaft 61.

An inner race B2a of a bearing B2 is press fitted on the outer circumference of the support unit 602 of the differential case 60.

An outer race B2b of the bearing B2 is held by a ring-shaped support unit 131 of the case 13, and the support unit 602 of the differential case 60 is supported to be able to rotate by the case 13 with the bearing B2 interposed.

The drive shaft 8A that penetrates an opening 130 of the case 13 is inserted from the rotation axis X direction in the support unit 602, and the drive shaft 8A is supported to be able to rotate by the support unit 602.

The lip seal RS is fixed to the inner circumference of the opening 130, and by a lip section (not illustrated) of the lip seal RS being elastically in contact with the outer circumference of the drive shaft 8A, the gap between the outer circumference of the drive shaft 8A and the inner circumference of the opening 130 is sealed.

As shown in FIG. 1, the drive shaft 8B that penetrates an opening 114 of the cover 11 is inserted in the differential case 60 from the abutting unit 601 side (right side in the drawing).

The drive shaft 8B is provided across the motor shaft 20 of the motor 2 and the inner diameter side of the sun gear 51 of the planetary reduction gear 5 in the rotation axis X direction, and the tip end side of the drive shaft 8B is inserted inside the differential case 60.

The lip seal RS is fixed to the inner circumference of the opening 114 of the cover 11, and the gap between the outer circumference of the drive shaft 8B and the inner circumference of the opening 114 is sealed by the lip part (not illustrated) of the lip seal RS being elastically in contact with the outer circumference of the drive shaft 8B.

As shown in FIG. 4, in the interior of the differential case 60, side gears 63A, 63B are spline fitted at the outer circumference of the tip end part of the drive shafts 8A, 8B, and the side gears 63A, 63B and drive shafts 8 (8A, 8B) are linked to be able to rotate integrally around the rotation axis X.

Shaft holes 60a, 60b penetrating the differential case 60 in the direction orthogonal to the rotation axis X are provided at symmetrical positions sandwiching the rotation axis X.

The shaft holes 60a, 60b are positioned on the axis line Y that is orthogonal to the rotation axis X, and the one end 61a side and the other end 61b side of the shaft 61 are inserted.

The one end 61a side and the other end 61b side of the shaft 61 is fixed to the differential case 60 by a pin P, and the shaft 61 is prohibited from auto-rotating around the axis line Y.

The shaft 61 is positioned along the axis line Y between the side gears 63A, 63B inside the differential case 60.

The bevel gears 62A, 62B are externally fitted on the shaft 61 inside the differential case 60 and supported to be able to rotate.

Two bevel gears 62A, 62B are provided with a gap opened in the longitudinal direction of the shaft 61 (axial direction of the axis line Y), and the bevel gears 62A, 62B are arranged in a state so that their teeth face each other.

In the shaft 61, the bevel gears 62A, 62B are provided with the shaft center of the bevel gears 62A, 62B matched to the shaft center of the shaft 61.

Inside the differential case 60, the side gears 63A, 63B are positioned at both sides of the bevel gears 62A, 62B in the axial direction of the rotation axis X.

Two side gears 63A, 63B are provided with a gap open in the axial direction of the rotation axis X in a state so that their teeth face each other, and the bevel gears 62A, 62B and the side gears 63A, 63B are assembled in a state with the teeth mutually engaged.

As described above, with the present embodiment, the carrier 55 (side plates 551, 651, pinion shaft 54) of the planetary reduction gear 5 is substantially formed integrally with the differential case 60.

In addition to shaft holes 60a, 60b of the shaft 61, the side plate 651 having the support hole 651a of the pinion shaft 54 is provided integrally with the differential case 60.

Here, the shaft holes 60a, 60b in the differential case 60 are provided at positions intersecting with the center line of the shaft 61 (axis line for which the center of the shaft 61 extends along the longitudinal direction and also is orthogonal to the rotation axis X: axis line Y), and the opening direction of the shaft holes 60a, 60b is the axis line Y direction.

When attaching the shaft 61 to the differential case 60, after inserting the shaft 61 from the axis line Y in one shaft hole of the shaft holes 60a, 60b, the one end 61a and the other end 61b of the shaft 61 are supported by the shaft hole 60a and the shaft hole 60b. For that reason, with the differential case 60, to ensure support strength of the shaft 61 in the shaft holes 60a, 60b, thick boss parts 605, 605 surrounding the shaft holes 60a, 60b (see FIG. 4) are formed.

As shown in FIG. 5(b), seen from the rotation axis X direction, when the positions of the shaft holes 60a, 60b are set so that the axis line Y intersects with the support hole 651a of the pinion shaft 54, the side plate 651 that has the support hole 651a is arranged on the axis line Y when seen from the rotation axis X direction.

In this case, when the positions of the shaft holes 60a, 60b and the position of the side plate 651 match in the rotation axis X direction, seen from the radial direction of the rotation axis X, the shaft holes 60a, 60b are hidden by the side plate 551.

As described above, attachment of the shaft 61 to the differential case 60 is performed by inserting the shaft 61 from the axis line Y direction into one shaft hole of the shaft holes 60a, 60b. For that reason, when the shaft holes 60a, 60b are hidden by the side plate 551, a problem occurs with attachment of the shaft 61 to the differential case 60.

For that reason, when setting the positions of the shaft holes 60a, 60b so that the axis line Y intersects with the support hole 651a of the pinion shaft 54 when seen from the rotation axis X direction, it is necessary to set the position of the shaft holes 60a, 60b and the position of the side plate 651 separated in the rotation axis X direction (see FIG. 5(a), (b)).

Figure 5:
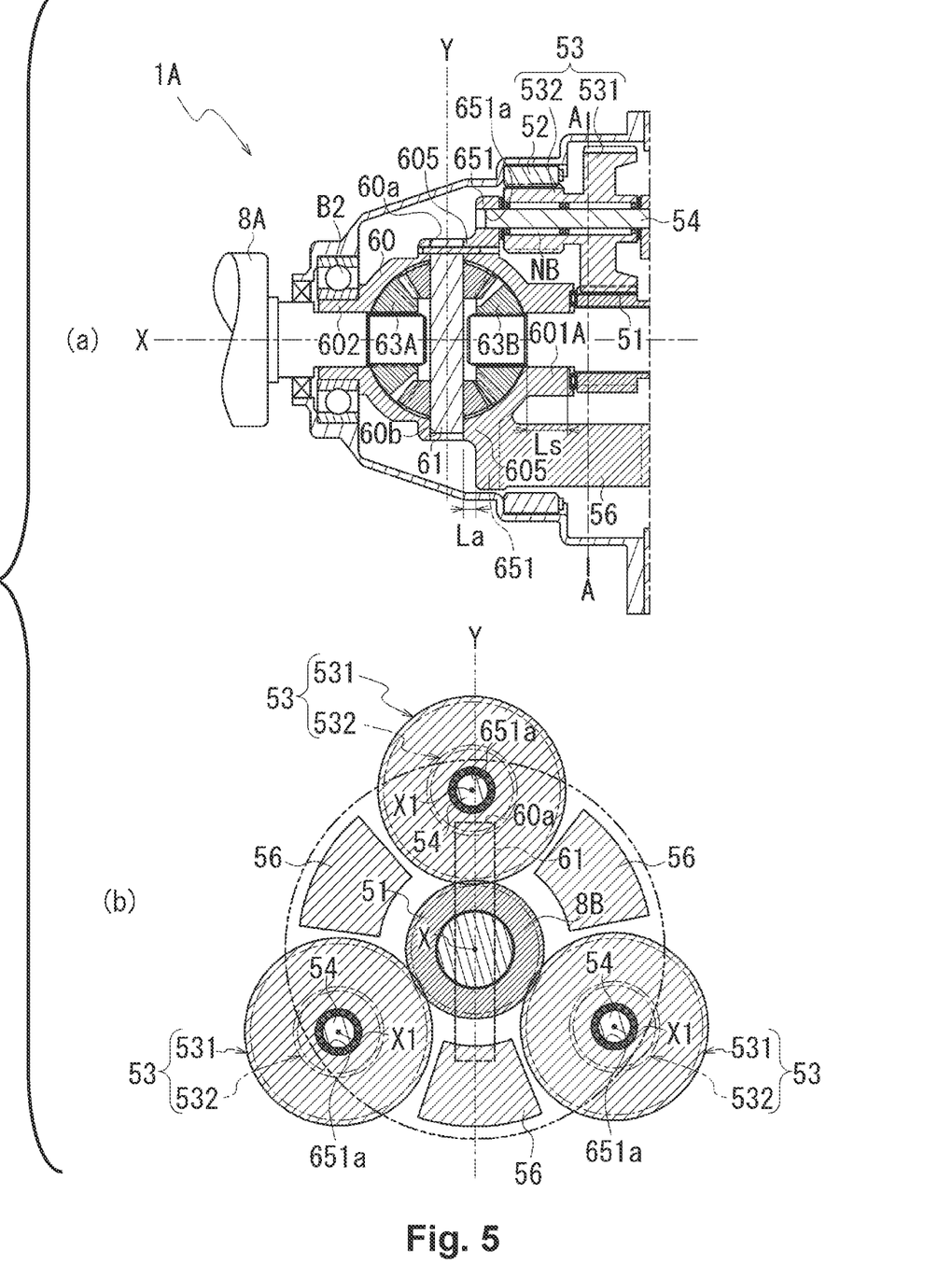
FIG. 5 is a drawing showing a comparison example of the arrangement of a reduction mechanism and the differential device.

With a power transmission device 1A in the comparison example shown in FIG. 5, seen from the rotation axis X direction, the axis line Y intersects the support hole 651a of the pinion shaft 54.

For that reason, with the power transmission device 1A of the comparison example, so that attachment of the shaft 61 to the differential case 60 is not obstructed, the position of the side plate 651 having the support hole 651a is set to a position separated by a prescribed distance La in the rotation axis X direction from the position of the edge of the shaft holes 60a, 60b (see FIG. 5(a)).

For that reason, with the power transmission device 1A in the comparison example, the length of the rotation axis X direction becomes longer by the amount that the position of the side plate 651 is separated rom the positions of the shaft holes 60a, 60b in the rotation axis X direction.

In contrast to this, as shown in FIG. 3(a), with the power transmission device 1 of the present embodiment, the positions of the shaft holes 60a, 60b are set so that the axis line Y does not intersect the support hole 651a of the pinion shaft 54 when seen from the rotation axis X direction.

Specifically, the positional relationship of the axis line Y and each support hole 651a is set so that the side plate 651 having the support hole 651a is in a position that does not overlap the shaft holes 60a, 60b provided on the differential case 60 when seen from the radial direction of the rotation axis X.

For that reason, as shown in FIG. 2, the position of the side plate 651 having the support hole 651a and the position of the shaft holes 60a, 60b are overlapping in the radial direction of the rotation axis X.

Specifically, with the differential case 60, although the position of the side plate 651 and the positions of the shaft holes 60a, 60b are arranged in the same position in the rotation axis X direction (lateral direction in the drawing), the positions of the shaft holes 60a, 60b and the position of the side plate 651 are separated in the circumferential direction around the rotation axis X.

This makes it possible to insert and arrange the area of the motor 2 side of the differential case 60 (right side in the drawing) on the inner diameter side of the small diameter gear part 532 of the stepped pinion gear 53 (rotation axis X) side as shown in FIG. 3(b).

For that reason, with the power transmission device 1 of the present embodiment, the differential case 60 is arranged closer to the large diameter gear part 531 of the stepped pinion gear 53 than the power transmission device 1A in the comparison example. With the power transmission device 1 of the present embodiment, instead of the support unit 601A comprised in the differential case 60 of the power transmission device 1A in the comparison example, the abutting unit 601 which has a short length in the rotation axis X direction is provided in the differential case 60.

This makes the length of the rotation axis X direction of the power transmission device 1 shorter by the amount the abutting unit 601 is adopted instead of the support unit 601A.

As described above, the carrier 55 (side plates 551, 651, pinion shaft 54) of the planetary reduction gear 5 is substantially formed integrally with the differential case 60.

For that reason, the shaft 61, the shaft holes 60a, 60b of the differential case 60, and the side plate 551 that has the support hole 551a have a fixed positional relationship when seen from the rotation axis X direction.

In light of that, the positional relationship in the case of the power transmission device 1 of the present embodiment, which is the positional relationship of the shaft 61, the shaft holes 60a, 60b of the differential case 60, and the side plate 551 that has the support hole 551a, is explained while referring to FIG. 3(a).

With the present embodiment, the center of the shaft 61 extends along the longitudinal direction, and two support holes 651a, 651a are positioned at one side with the axis line Y orthogonal to the rotation axis X as the reference, while one support hole 651a is positioned at the other side.

In a case when the support hole 651a of the other side is positioned on an axis line V that is orthogonal to the axis line Y and the rotation axis X, the two support holes 651a, 651a of the one side are provided in a positional relationship sandwiching the axis line V symmetrically.

The positions of the two support holes 651a, 651a of the one side are determined so that connecting lines Lc, Lc that connect the centers of the two support holes 651a, 651a of the one side each have the same intersection angle $\theta$ with respect to the axis line Y.

The intersection angle θ is set considering a width W (diameter) of the shaft 61 so that the side plate 651 having the support hole 651*a* is arranged at a position that does not interfere with the boss parts 605 that surround the shaft holes 60*a*, 60*b*.

In this way, with the differential case 60, although the position of the side plate 651 and the positions of the shaft holes 60*a*, 60*b* are arranged at the same position in the rotation axis X direction (lateral direction in FIG. 2), as shown in FIG. 3(*a*), the positions of the shaft holes 60*a*, 60*b* and the position of the side plate 651 are separated in the circumferential direction around the rotation axis X.

For that reason, as shown in FIG. 3(*b*), it is possible to insert the area of the motor 2 side of the differential case 60 (right side in the drawing) in the inner diameter side (rotation axis X) side of the small diameter gear part 532 of the stepped pinion gear 53, to arrange close to the motor 2.

By doing this, with the power transmission device 1 of the present embodiment, the length of the rotation axis X direction becomes shorter by the amount that the differential case 60 is closer to the motor 2.

The action of the power transmission device 1 of this configuration is explained.

With the power transmission device 1, the planetary reduction gear, the differential device 6, and the drive shafts 8 (8A, 8B) are provided along the transmission route of the output rotation of the motor 2.

When the rotor core 21 rotates around the rotation axis X by the driving of the motor 2, the rotation is inputted to the sun gear 51 of the planetary reduction gear 5 via the motor shaft 20 that rotates integrally with the rotor core 21.

With the planetary reduction gear 5, the sun gear 51 serves as the input unit of the output rotation of the planetary reduction gear 5, and the carrier 55 that supports the stepped pinion gear 53 serves as the output unit of the inputted rotation.

When the sun gear 51 rotates around the rotation axis X by the inputted rotation, the stepped pinion gear 53 (large diameter gear part 531, small diameter gear part 532) rotates around the axis line X1 by the rotation inputted from the sun gear 51 side.

Here, the small diameter gear part 532 of the stepped pinion gear 53 is engaged with the ring gear 52 fixed to the inner circumference of the case 13. For that reason, the stepped pinion gear 53 rotates around the rotation axis X while auto-rotating around the axis line X1.

By doing this, the carrier 55 (side plates 551, 651) that support the stepped pinion gear 53 rotates around the rotation axis X at a rotation speed lower than the rotation inputted from the motor 2 side.

Here, with the stepped pinion gear 53, the outer diameter R2 of the small diameter gear part 532 is smaller than the outer diameter R1 of the large diameter gear part 531 (see FIG. 3).

For that reason, the rotation inputted to the sun gear 51 of the planetary reduction gear 5 is significantly reduced by the stepped pinion gear 53, after which it is outputted to the differential case 60 (differential device 6) with which the side plate 651 of the carrier 55 is integrally formed.

By the differential case 60 rotating around the rotation axis X by the inputted rotation, the drive shafts 8 (8A, 8B) rotate around the rotation axis X, with transmission to the left and right drive wheels (not illustrated) of the vehicle in which the power transmission device 1 is mounted.

As described above, the power transmission device 1 of the present embodiment has the following configuration.

(1) With the power transmission device 1, the carrier 55 of the planetary reduction gear 5 (planetary gear) and the differential case 60 (differential case) of the differential device 6 (differential gear) are formed integrally.

The carrier 55 of the planetary reduction gear 5 has support holes 651*a*, 551*a* (pinion shaft insertion holes) in which the pinion shaft 54 is inserted.

The pinion shaft 54 supports the stepped pinion gear 53 (pinion gear) with the ability to rotate.

The differential case 60 has shaft holes 60*a*, 60*b* (bevel gear shaft insertion holes) in which the shaft 61 (bevel gear shaft) is inserted.

The shaft 61 supports the pair of bevel gears 62A, 62B (bevel gears) with the ability to rotate.

The straight line (axis line Y) that penetrates the shaft hole 60*a* and the shaft hole 60*b* is set avoiding overlapping in the circumferential direction with the plurality of support holes 651*a*.

The shaft 61 passes through the center of the virtual circle Im (circle) that connects the plurality of support holes 651*a*.

When attaching the power transmission device 1, the shaft 61 is inserted in the shaft holes 60*a*, 60*b* of the differential case 60 from the axis line Y that is orthogonal to the rotation axis X.

A plurality of the pinion shafts 54 of the planetary reduction gear 5 are provided in the circumferential direction around the rotation axis X, and the same number of the support holes 651*a*, 551*a* of the pinion shaft 54 as the pinion shafts 54 are provided in the circumferential direction around the rotation axis X.

For that reason, in the cross section view of the power transmission device 1 seen from the radial direction of the rotation axis X, when the extension line in which the support holes 651*a*, 551*a* (pinion shaft insertion holes) extend (axis line X1) and the extension line in which the shaft holes 60*a*, 60*b* (bevel gear shaft insertion holes) extend (axis line Y) are arranged so as to intersect (collide), the following kinds of problems may occur.

Specifically, seen from the rotation axis X direction, with the positional relationship of the axis line X1 and the axis line Y intersecting, when the positions of the support holes 651*a*, 551*a* and the shaft holes 60*a*, 60*b* are determined, in the differential case 60, it is necessary that the position of the side plate 651 having the support hole 651*a* and the position of the shaft holes 60*a*, 60*b* be separated in the rotation axis X direction.

This is because when a positional relationship such as one in which the position of the support hole 651*a* and the positions of the shaft holes 60*a*, 60*b* in the rotation axis X direction overlap when seen from the radial direction of the rotation axis X is set, problems occur with insertion of the shaft 61 in the shaft holes 60*a*, 60*b*.

For that reason, for the convenience of the pinion shafts 54 being inserted in the corresponding shaft holes 60*a*, 60*b*, the shaft holes 60*a*, 60*b* need to be arranged separated from the support hole 651*a* in the rotation axis X direction. Having done that, the power transmission device 1 increases in size in the rotation axis X direction.

In light of that, as described above, the two extension lines (axis lines X1, Y) are made to not intersect. Specifically, seen from the rotation axis X direction, the positions of the support holes 651*a*, 551*a*, and shaft holes 60*a*, 60*b* are determined by the positional relationship by which the axis line X1 and the axis line Y do not intersect.

This makes it possible to push the position of the shaft holes 60a, 60b in which the shaft 61 is inserted into the back side (motor 2 side) closer to the pinion shaft 54 in the rotation axis X direction.

As a result, the straight line that penetrates the shaft holes 60a, 60b (axis line Y) is arranged overlapping the plurality of support holes 651a in the circumferential direction around the rotation axis X, and it is possible to reduce the size of the power transmission device 1 in the rotation axis X direction.

It is also possible to provide a pin (bevel gear shaft) corresponding to the shaft 61 on each of the plurality of bevel gears. Having done that, there is only one location of the support position of the pin in the differential case 60, and the rotation of the bevel gear becomes unstable.

As with the power transmission device 1 of the present embodiment, by arranging the shaft 61 (bevel gear shaft) that supports the pair of bevel gears 62A, 62B at a position that passes through the center of the virtual circle Im (circle) (position that intersects the rotation axis X) that connects the plurality of support holes 651a (pinion shaft insertion holes), the support of the shaft 61 in the differential case 60 is stabilized, and it is possible to obtain stable rotation of the bevel gears 62A, 62B supported by the shaft 61.

The power transmission device 1 of the present embodiment has the following configuration.

(2) Seen from the rotation axis X direction, the straight line (axis line Y) that penetrates the shaft holes 60a, 60b of the shaft 61 passes through the area adjacent to one support hole 651a and the area adjacent to another support hole 651a of the plurality of support holes 651a arranged at prescribed intervals in the circumferential direction around the rotation axis X.

The area adjacent to the one support hole 651a is the area of the shaft 61 side (right side in the drawing) seen from the support hole 651a of the pinion shaft 54 positioned at the top side, at the left side of the axis line Y in FIG. 3(a).

The area adjacent to the other support hole 651a is the area of the shaft 61 side (right side in the drawing) seen from the support hole 651a of the pinion shaft 54 positioned at the lower side, at the left side of axis line Y in FIG. 3(a).

It is possible to support the shaft 61 that supports the pair of bevel gears 62A, 62B by the differential case 60 without intersecting any of the support holes 651a seen from the rotation axis X direction.

This makes it possible to insert the differential case 60 in the inner diameter side of the small diameter gear part 532 of the stepped pinion gear 53, to arrange close to the motor 2. This makes it possible to reduce the size of the power transmission device 1 in the rotation axis X direction.

The power transmission device 1 of the present embodiment has the following configuration.

(3) Seen from the rotation axis X direction, the positions of the shaft holes 60a, 60b of the shaft 61 are set so that the straight line (axis line Y) that penetrates the shaft holes 60a, 60b of the shaft 61 does not intersect with any of the support holes 651a of the pinion shaft 54.

By configuring in this way, it is possible to arrange the side plate 651 that has the support hole 651a in the differential case 60 at a position that does not interfere with the boss parts 605 surrounding the shaft holes 60a, 60b.

Specifically, it is possible to have the position of the shaft holes 60a, 60b and the position of the side plate 651 be separated in the circumferential direction around the rotation axis X as shown in FIG. 3(a).

This makes it possible to arrange the position of the side plate 651 and the positions of the shaft holes 60a, 60b in the differential case 60 at the same position in the rotation axis X direction (lateral direction in FIG. 2). This makes it possible to insert the area of the motor 2 side (right side in the drawing) of the differential case 60 in the inner diameter side (rotation axis X) side of the small diameter gear part 532 of the stepped pinion gear 53, to arrange close to the motor 2.

The power transmission device 1 of the present embodiment has the following configuration.

(4) The carrier 55 and the differential case 60 are formed integrally.

By configuring in this way, it is possible to increase the rigidity and strength of the carrier 55.

The power transmission device 1 of the present embodiment has the following configuration.

(5) The motor 2 is connected upstream of the planetary reduction gear 5.

The drive shaft 8B arranged penetrating the inner circumference of the motor 2 is connected downstream of the differential device 6.

By configuring in this way, it is possible to reduce the size in the vertical direction (gravity direction).

Here, the term "connected downstream" in this specification means being in a connection relationship in which the power is transmitted from the components arranged upstream to the components arranged downstream.

For example, in the case of the planetary reduction gear 5 connected downstream of the motor 2, this means that the power is transmitted from the motor 2 to the planetary reduction gear 5.

Also, the term "directly connected" in this specification means that the members are connected with the ability to transmit power to each other without the interposition of another member by which the reduction ratio is converted such as a reduction mechanism, an acceleration mechanism, a shifting mechanism, etc.

With the embodiments described above, an example was shown of the planetary reduction gear 5 that uses the stepped pinion gear 53, but it is also possible to use a planetary reduction gear that uses a pinion gear that is not stepped.

The linked mode of the output unit of the motor 2 (motor shaft 20) and the input unit of the planetary reduction gear 5 (sun gear 51) is not limited to the embodiments described above.

The linked mode of the output unit of the motor 2 (motor shaft 20) and the input unit of the planetary reduction gear 5 (sun gear 51) may also be a configuration in which linking is done with the ability to do rotation transmission with another gear component, etc., interposed.

Furthermore, with the present embodiments, an example was shown of a case when the reduction mechanism is the planetary reduction gear 5 comprising the stepped pinion gear 53, and one planetary reduction gear 5 is provided on the transmission route of the output rotation of the motor 2.

The present invention is not limited to only this mode. It is also possible to configure so that a plurality of planetary reduction gears are arranged in series on the transmission route of the output rotation of the motor 2.

Above, embodiments of the invention of the present application were explained, but the invention of the present application is not limited to only the modes shown in these embodiments. Changes can be made as appropriate within the scope of the technical concept of the invention.

The invention claimed is:
1. A power transmission device comprising:
   a planetary gear including a carrier, and pinion gears supported by pinion shafts, with the carrier being rotatable about a rotational axis;

a differential gear including a pair of bevel gears supported by a bevel gear shaft, and side gears engaged with the pair of bevel gears;

a differential case in which the differential gear is arranged, wherein the carrier defines pinion shaft insertion holes in which the pinion shafts are respectively inserted, the differential case defines bevel gear shaft insertion holes in which the bevel gear shaft is inserted, a straight line that penetrates the bevel gear shaft insertion holes overlaps with the pinion shaft insertion holes when viewed along a circumferential direction about the rotational axis, and the bevel gear shaft passes through a center of a circle that connects the pinion shaft insertion holes, when viewed along an axial direction of the rotational axis, the pinion shafts do not overlap the side gears, with the side gears being arranged radially inwardly than the pinion shafts, and when viewed along the axial direction, the straight line that penetrates the bevel gear shaft insertion holes does not pass through any of the pinion shaft insertion holes.

2. The power transmission device according to claim 1, wherein the straight line that penetrates the bevel gear shaft insertion holes passes through an area adjacent to one of the pinion shaft insertion holes, and an area adjacent to another of the pinion shaft insertion holes.

3. The power transmission device according to claim 2, wherein the carrier and the differential case are formed integrally.

4. The power transmission device according to claim 1, wherein the carrier and the differential case are formed integrally.

5. The power transmission device according to claim 1, further comprising:

a motor connected upstream of the planetary gear; and a drive shaft connected downstream of the differential gear, the drive shaft penetrating through a region surrounded by an inner circumference of the motor.

6. The power transmission device according to claim 5, wherein the carrier and the differential case are formed integrally.

7. The power transmission device according to claim 1, wherein when viewed along a radial direction, the pinion gears overlap teeth of the side gears.

8. The power transmission device according to claim 7, wherein the carrier and the differential case are formed integrally.

* * * * *